United States Patent
Hamaguchi et al.

(10) Patent No.: US 6,906,889 B2
(45) Date of Patent: Jun. 14, 2005

(54) MAGNETIC DISK DRIVE

(75) Inventors: Takehiko Hamaguchi, Tokyo (JP);
Hisashi Takano, Tokyo (JP); Futoshi Tomiyama, Tokyo (JP); Toru Matsushita, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 204 days.

(21) Appl. No.: 10/217,452

(22) Filed: Aug. 14, 2002

(65) Prior Publication Data
US 2002/0191328 A1 Dec. 19, 2002

Related U.S. Application Data

(63) Continuation of application No. 09/376,354, filed on Aug. 18, 1999, now Pat. No. 6,515,817.

(30) Foreign Application Priority Data

Aug. 20, 1998 (JP) ............................................ 10-233835

(51) Int. Cl.[7] .............................................. G11B 5/596
(52) U.S. Cl. .................................................. 360/78.04
(58) Field of Search ............................... 360/78.04, 69, 360/53, 73.03, 72.1, 78.01, 97.02, 77.02; 369/44.29; 718/101; 702/141; 318/650

(56) References Cited

U.S. PATENT DOCUMENTS 5,412,809 A * 5/1995 Tam et al. .................. 713/324
5,615,368 A * 3/1997 Terashima et al. .......... 718/101
5,631,787 A * 5/1997 Huang et al. ............. 360/97.02
5,682,272 A * 10/1997 Taroda et al. ................. 360/53
5,682,334 A * 10/1997 Plutowski et al. .......... 702/141
5,715,218 A * 2/1998 Ikeda ...................... 369/44.29
5,774,292 A * 6/1998 Georgiou et al. ......... 360/73.03
5,801,894 A * 9/1998 Boutaghou et al. ........ 360/72.1
5,914,581 A * 6/1999 Suzuki et al. ............... 318/798
5,982,570 A * 11/1999 Koizumi et al. .............. 360/69
6,304,405 B1 * 10/2001 Asano et al. ............. 360/73.03
6,377,015 B1 * 4/2002 Nakabayashi et al. ...... 318/650
6,512,652 B1 * 1/2003 Nelson et al. ............ 360/78.01

* cited by examiner

Primary Examiner—David Hudspeth
Assistant Examiner—Fred F. Tzeng
(74) Attorney, Agent, or Firm—Mattingly, Stanger, Malur & Brundidge, P.C.

(57) ABSTRACT

A magnetic disk drive has a low power consumption state in which the spindle motor is stopped for reducing the average power consumption when no read or write commands have been received. When a read or write command is received, the spindle motor is started. The time it takes to complete a read command is shorter than that for a write command as measured from the receipt of the read command or write command with the spindle motor stopped in the low power consumption state.

3 Claims, 15 Drawing Sheets

TABLE OF DISTURBANCE COMPENSATION PARAMETERS

| | TEMPERATURE 0~10 (°C) | TEMPERATURE 10~20 (°C) | ... | TEMPERATURE 60~70 (°C) |
|---|---|---|---|---|
| CYLINDER 0 | +50 | +38 | | +25 |
| CYLINDER 1000 | +36 | +24 | | +18 |
| CYLINDER 2000 | +30 | +19 | | +10 |
| CYLINDER 3000 | +28 | +13 | | +6 |
| ... | | | | |
| CYLINDER 15000 | +15 | -8 | | -16 |
| CYLINDER 16000 | +13 | -11 | | -23 |

TEMPERATURE = 18°C  CYLINDER = 2600
SEARCH DISTURBANCE COMPENSATION PARAMETERS

+19 DATA COMPUTATION → +15
+13

| THERMAL-DATA |
|---|
| CYLINDER DATA |

*FIG. 11*

MAGNETIC DISK DRIVE

This is a continuation application of U.S. Ser. No. 09/376,354 filed Aug. 18, 1999 now U.S. Pat. No. 6,515,817.

BACKGROUND OF THE INVENTION

1. Field of the Invention

The present invention relates to a magnetic disk drive in which the rotation of the spindle motor is halted or stopped for the purpose of achieving lower power consumption. In particular, the invention relates to a magnetic disk drive for reducing the recovery time from the stopped or halted condition of the spindle motor to a rotational speed at which read and write can be performed.

2. Description of the Related Art

A head of a magnetic disk drive moves in the radial direction during rotation of the disk, and is accurately positioned to a target data track for performing read and write of information magnetically. FIG. 1 shows a sectional diagram of the configuration of a typical magnetic disk drive, which includes six heads 11, three disks 12-1, 12-2, 12-3 and a rotary actuator 13 that are stored in an enclosure. The heads 11 are supported by the rotary actuator 13 and are driven by a voice coil motor 14. Read and write are performed on both sides of the disks 12-1, 12-2 and 12-3, respectively. A package board 17 having the main part of the electronic circuits for controlling the magnetic disk drive is placed outside of the enclosure.

FIG. 2 shows a plan view indicating a configuration of an enclosure of a magnetic disk drive. A disk 12 rotates around an axis A in the direction indicated by an arrow, at the speed of several thousand rotations per minute. A rotary actuator 13 is driven by a voice coil motor, performs a reciprocating rotation motion pivotally around a position B and can move head 11 in the radial direction of the disk 12 as indicated by an arrow. Head preamplifier 15 for read and write, which is a part of the electronic circuits are not placed on a package board 17 of FIG. 1, is shown in this figure.

FIG. 3 shows a partial plan view of a magnetic disk drive including a data track 16, a magnetic disk 12 and a head 11 of a rotary actuator 13. Servo information for representing the positioning information of the head 11 is written on the magnetic disk 12 beforehand, for example at the factory. The electric power supplied to the voice coil motor is based upon the positioning information and is regulated to achieve accurate positioning of the head 11 for a target track 16 which is performed via a rotary actuator 13. The head positioning process for the target track is called a following operation. While the following operation is performed, the read and write of information are performed magnetically. Although tracks 16-1, 16-2, 16-3, 16-4 and 16-5 are indicated respectively by a solid line in FIG. 3, these tracks 16-1 through 16-S are produced by magnetic information and cannot be recognized optically. Since these tracks number more than ten thousand on the disk 12, the tracks have a much greater density than as shown in FIG. 3.

An operation for halting or stopping the rotation of the spindle motor for the purpose of reducing power consumption of the magnetic disk drive is widely employed in portable computers. For instance, the ATA interface standard standardized in X39.2 of ANSI sets forth an automatic power down sequence as a standard. According to this standard, the spindle motor is automatically halted and the power consumption is reduced when a data transfer request does not occur within a time predetermined by the user in a stand-by timer.

FIG. 4 shows a time chart of an automatic power down sequence. At first the disk is stopped in a stand-by status 40 and a host machine issues a command 35 for a magnetic disk drive to start rotation of a disk. In response, the magnetic disk drive performs the start of disk spin-up 30. The time it takes for increasing rotation of the disk is a process waiting time 37 and a status beginning from an end of the disk spin-up 31 is called an active status 41. Since the magnetic disk drive can perform read and write of data only in the active status 41, a command issued from the host machine is implemented in an execution time 38 as shown in FIG. 4. If the host machine does not issue an instruction after the issuance of the instruction 35 before elapse of the stand-by timer setting time, the start of disk spin-down 32 is executed to achieve stand-by status 42 at the end of disk spin down 33. Then, another start of disk spin-up 34 is executed when a command 36 is issued by the host processor. The process of issuing a command 35 and a next command 36 is a repetitive one.

FIG. 5 shows a time chart detailing the process from issuing a command 35 to waiting time 37 and execution time 38, as shown in FIG. 4. In an initial processing 52 soon after receiving the issuance of a read command 51 from the host machine, an interface circuit performs an instruction analysis, a system clock is initiated and a microprocessor is started up. Thereafter, there is the start of disk spin-up 68 for applying electric power to the spindle motor. Start-up rotation continues through a disk spin-up sequence 53 to an end of disk spin-up 69. At this time, a disturbance measurement 54 is performed for compensating for a disturbance added to an actuator in performing seek accurately. A main cause of the disturbance resides in the non-uniform wiring for a head mounted on the actuator or a voice coil motor and a non-uniform magnetic field in the magnet. Because the disturbance is influenced by the angle of the actuator or the ambient temperature, it is preferable to measure the disturbance under the circumstance where the hard disk drive is normally used. In an actual measurement, a method for repeating a dummy seek several times at different radial positions on the disk is often used and usually a method for performing the dummy seek not only at the time of starting up the disk but also at constant time intervals is employed in general. A seek 55 for a target track is performed after the disturbance measurement is performed. An actual read execution 56 is performed and the process moves to an end of the read command 57 after an end of the seek is confirmed. The time for the process from the issuance of the write command 61 to the end of execution of the write command 67 is the same as the time for the process from the issuance of read command 51 to the end of execution of the read command 57.

The time from the issuance of the read command 51 or the issuance of the write command 61 for the magnetic disk drive when it is in a stand-by status to the end of execution of the read command 57 or the end of execution of the write command 67 includes the time for the disk spin-up sequences 53 or 63 which are longer than the actual execution time for the read and write 56, 66. For data having 256 sectors, and for a magnetic disk drive using a glass disk approximately 63 mm in diameter which is typically used in a portable PC, the time for the read execution 56 and the write execution 66 is approximately 30 ms. Further, the time for performing the disk spin-up sequences 53 or 63 is approximately 1500 ms.

SUMMARY OF THE INVENTION

It is necessary for a long disk spin-up time for a magnetic disk drive under a stand-by status. Therefore, when an automatic power down sequence is in operation and a spindle motor is halted, despite the write command execution or the read command execution of a small number of sectors, a time of about a second is required and deterioration in the performance of the disk drive results. Based upon the access performance of the magnetic disk drive, it is preferred that the disk spin-up time be made shorter. A reduction of the disk spin-up time can be realized by increasing the electric power applied to the spindle motor or by maintaining a low normal operation rotation speed of the disk drive. However, the upper limit of electric power consumed by the magnetic disk drive is often restricted in a portable PC and the electric power applied to the spindle motor cannot be increased. From the viewpoint of data transfer speed of the magnetic disk drive, it is desirable that the normal operation rotational speed be as high as practical.

To achieve a reduction in power consumption of the magnetic disk drive and to maintain data access performance, there is a method for reducing the amount of inertia loss and rotary motion energy of the disk by employing a disk having a small diameter of less than 48 mm or a disk having a thin substrate of less than 0.5 mm. By employing this method, since a disk spin-up time is reduced enormously, despite halting of the disk rotation frequently, negative influences on the access performance can be decreased and a great effectiveness can be achieved in reducing the power consumption of the disk drive. However, a disk having a small diameter and a thin substrate has a disadvantage in that the storage capacity is reduced since the data area is decreased and there is a deterioration in the head positioning accuracy.

From the aforementioned points of view, the invention achieves reduction in power consumption of the magnetic disk drive through a stand-by function, and maintains access performance while avoiding reduction in memory capacity An object of the present invention is to provide a magnetic disk drive in which the time for executing a read command is shorter than the time for executing a write command, as measured from the receipt of the read command or the write command when the magnetic disk drive is in a condition in which the spindle motor is halted.

Preferably, the foregoing object is achieved by using initial parameters stored in advance in a semiconductor memory as disturbance compensation parameters of a seek operation at the time of receiving the read command of the data and by measuring the disturbance compensation parameters of the seek operation through a dummy seek at the time of receiving the write command of the data.

According to an object of the invention, a package board is provided having a non-volatile RAM in an enclosure. Preferably, disturbance compensation parameters of the seek operation for each magnetic disk are measured and written into the non-volatile RAM.

An object of the invention is to provide a seek operation that is minimally influenced by variations in disturbance compensation parameters caused by temperature. Preferably, a thermometer device is placed in the enclosure and the disturbance compensation parameters of the seek operation are computed on the basis of the thermal data output from the thermometer device.

In achieving these objects, it is desirable to use a minimum number of terminal connections for the package board and an inexpensive connector portion through which a serial interface protocol can be used for inputting and outputting data of the non-volatile RAM or the thermometer device.

Another object of the present invention is to execute read and write commands with a magnetic disk drive in a condition where a spindle motor is halted by selecting either a mode 1 normal operation rotation speed at the time of receiving a data read command or a mode 2 normal operation rotation speed at the time of receiving a data write command, wherein the mode 1 normal operation rotation speed has a lower speed than the mode 2 normal operation rotation speed.

In particular, disk access performance can be maintained for the read command execution at the mode 1 normal speed and during the speed-up from the mode 1 to the mode 2 normal operation rotation speed. Specifically, the data read operation can be performed by making the rotatory acceleration during speed-up from the mode 1 to the mode 2 normal operation rotation speed smaller than that at the time of speed-up from where the spindle motor is halted to the mode 1 or the mode 2 normal operation rotation speed.

Another object of the present invention is to execute a read operation by altering the clock frequency of a microprocessor or a hard disk controller in response to a speed of rotation of the spindle motor during a period of speed-up between the mode 1 and the mode 2 normal operation rotation speeds.

Another object of the present invention is to execute read and write commands in a magnetic disk drive when, at the time of receiving a read command, in a condition where a spindle motor is halted, an initial parameter that is stored in advance in a semiconductor memory is used as a disturbance compensation parameter of a seek operation at the time of receiving the read command. Further, disturbance compensation parameters of the seek operation are measured through a dummy seek operation at the time of receiving a write command.

BRIEF DESCRIPTION OF THE DRAWINGS

The embodiments of the present invention are described below in conjunction with the figures, in which;

FIG. 11 is a table indicating a process for computing a disturbance compensation parameter based on thermal data in the second embodiment of the magnetic disk drive of the present invention;

DESCRIPTION OF THE PREFERRED EMBODIMENT

A description will be given of the present invention by reference to the accompanying drawings.

<Embodiment 1>

Figure 1:
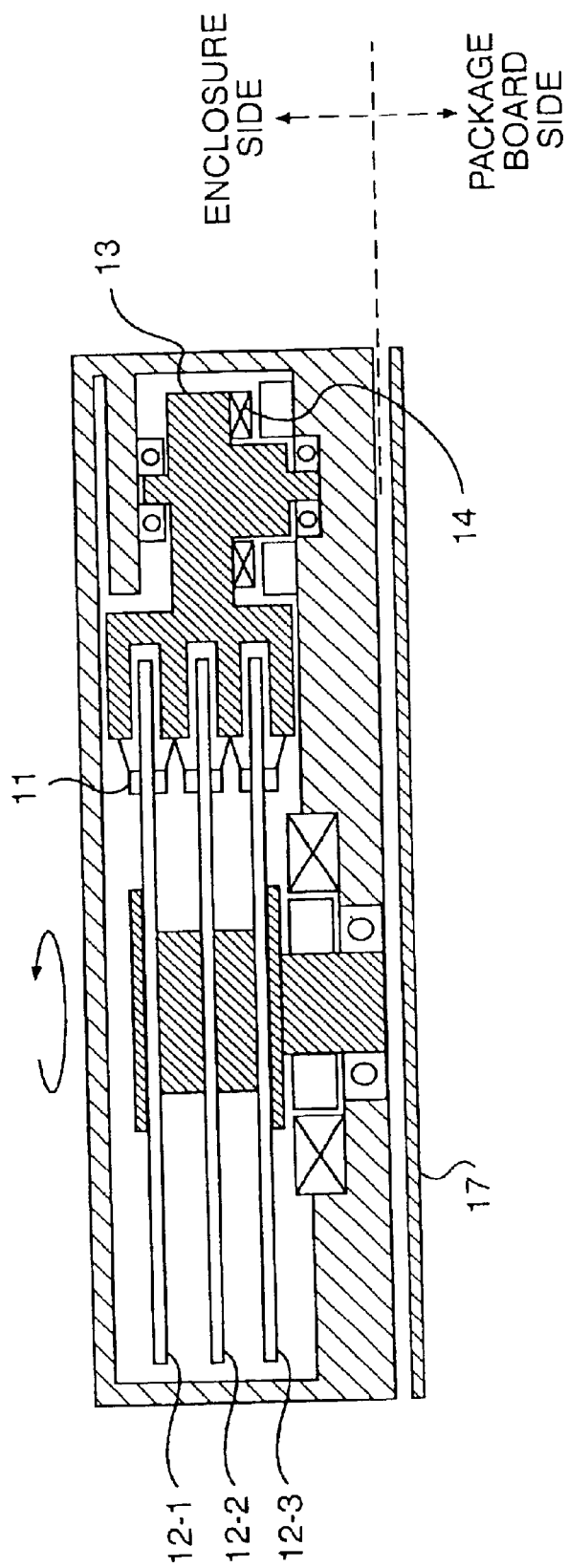
FIG. 1 shows a sectional diagram indicating a prior art example of a magnetic disk drive.
Figure 2:
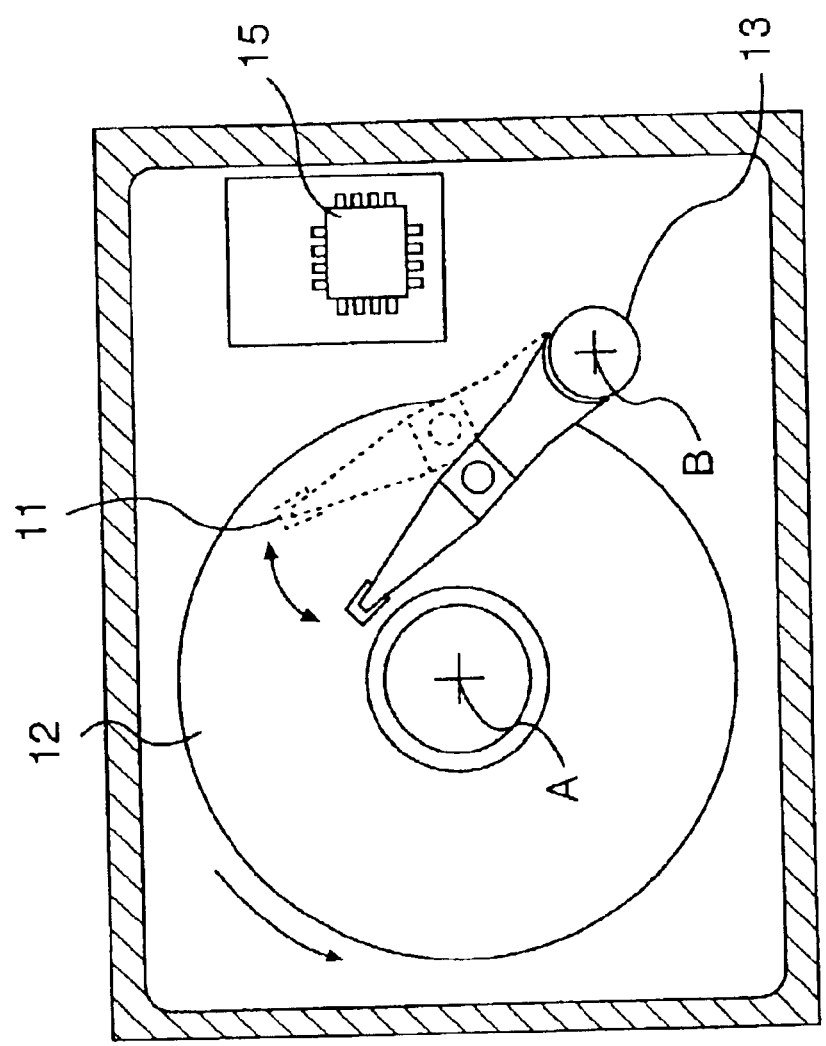
FIG. 2 shows a plan view indicating a prior art example of a magnetic disk drive.
Figure 3:
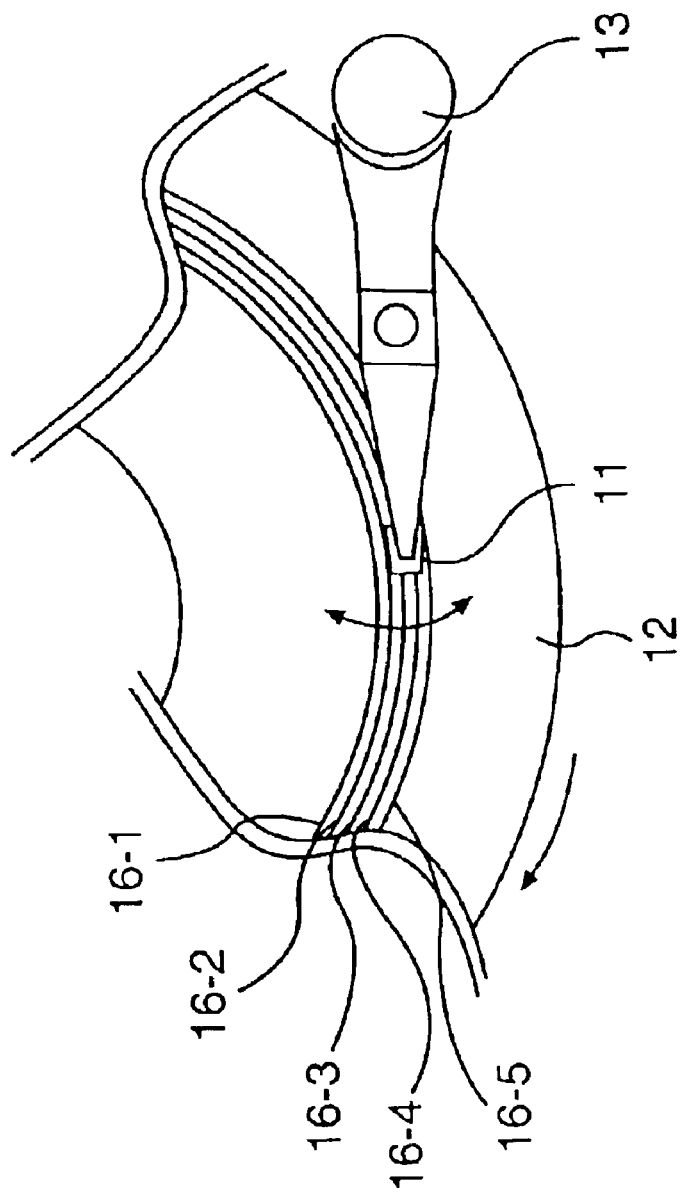
FIG. 3 Shows a partial plan view detailing tracks, a disk and a head of a rotary actuator in a magnetic disk drive.
Figure 4:
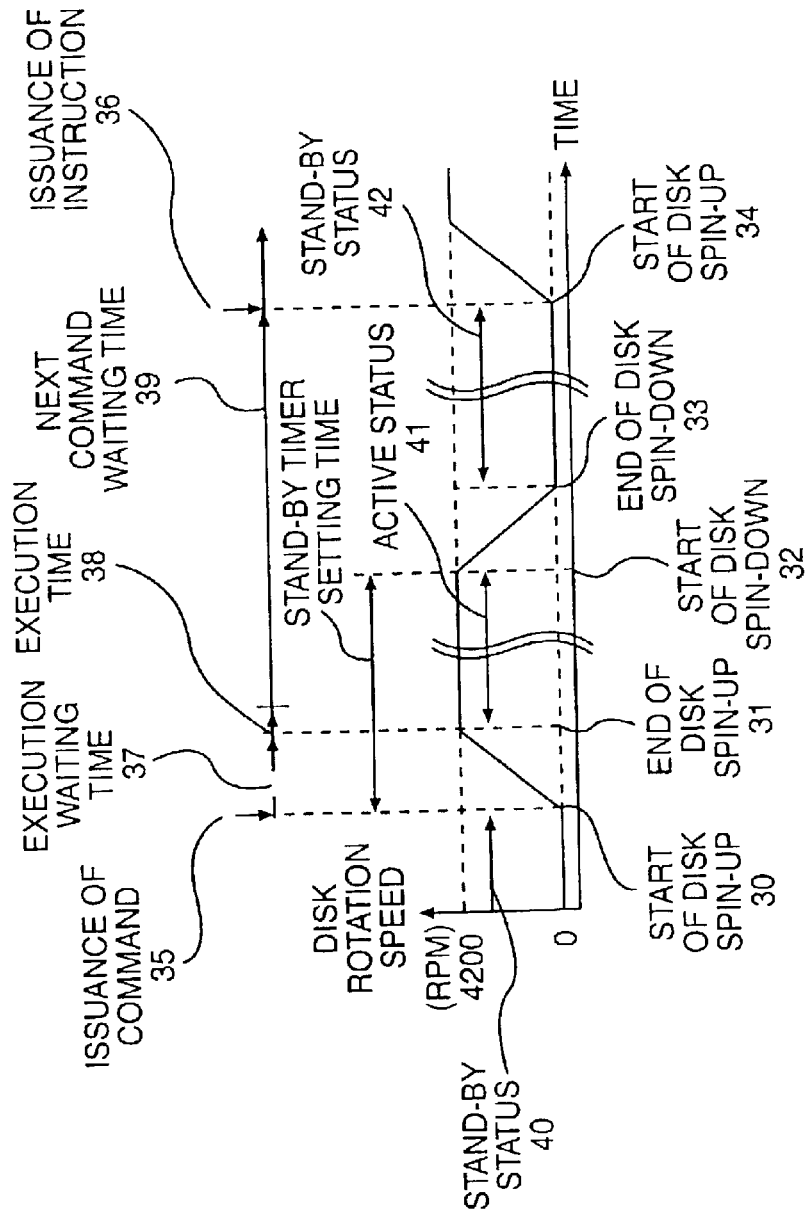
FIG. 4 shows a time chart describing a stand-by status and an active status of the prior art magnetic disk drive.
Figure 5:
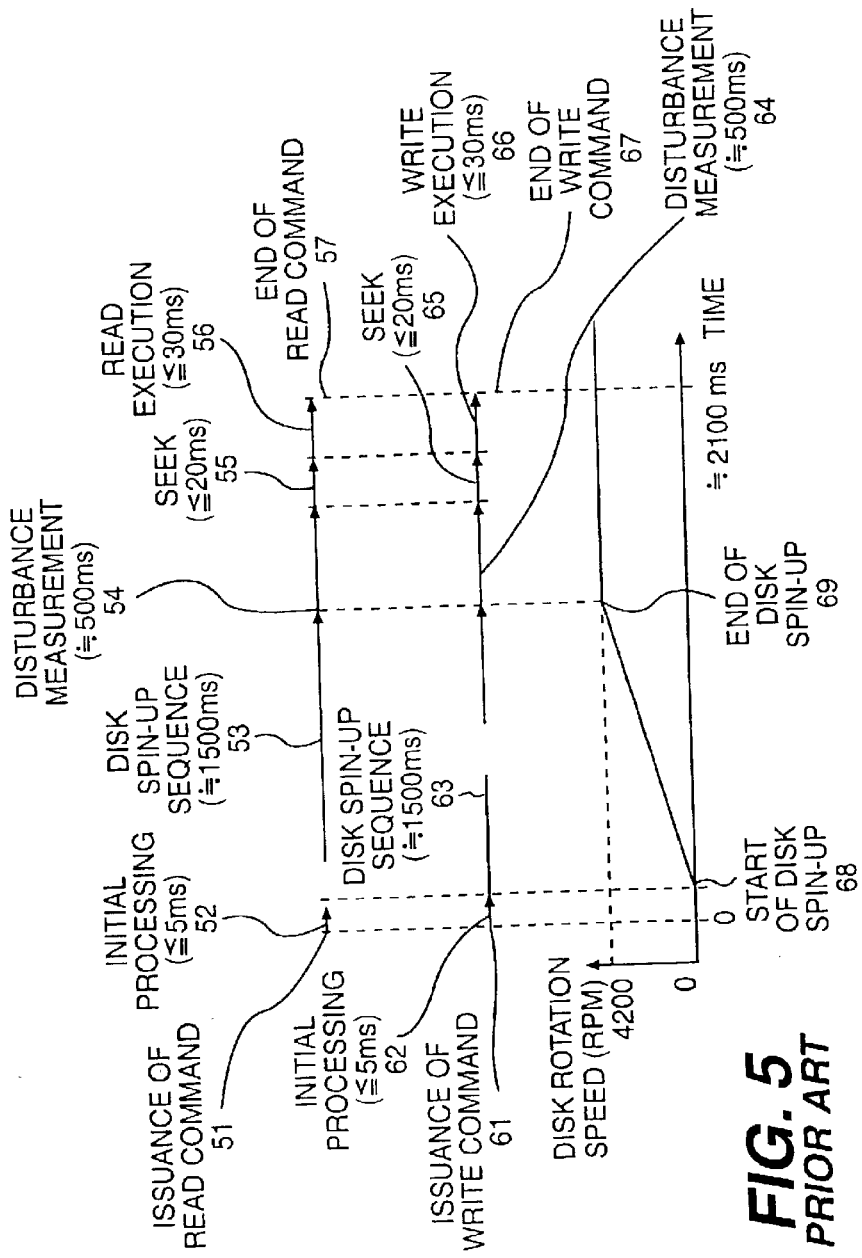
FIG. 5 shows a time chart describing a time from the receipt of a write command and a read command to the end of the command execution in the prior art magnetic disk drive.

The basic configuration of the magnetic disk drive of the present invention has the same features as described in the aforementioned conventional art with reference to by using FIGS. 1, 2 and 3. Further, the configuration of the invention has a function for reducing an average power consumption by automatically transitioning to a stand-by status as shown in the conventional art of FIG. 4.

Figure 6:
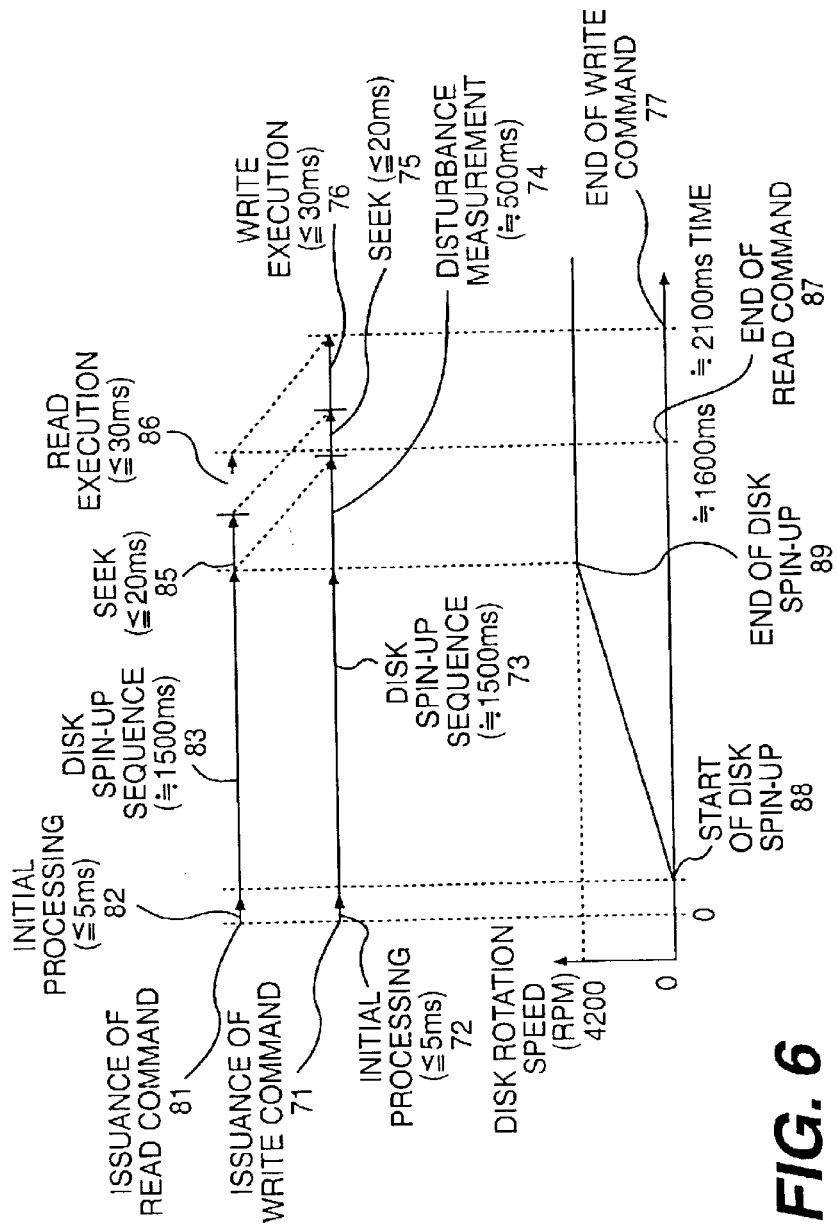
FIG. 6 shows a time chart describing a time from the receipt of a record write command and a read command to an end of the command execution in a first embodiment of a magnetic disk drive of the present invention.
Figure 7:
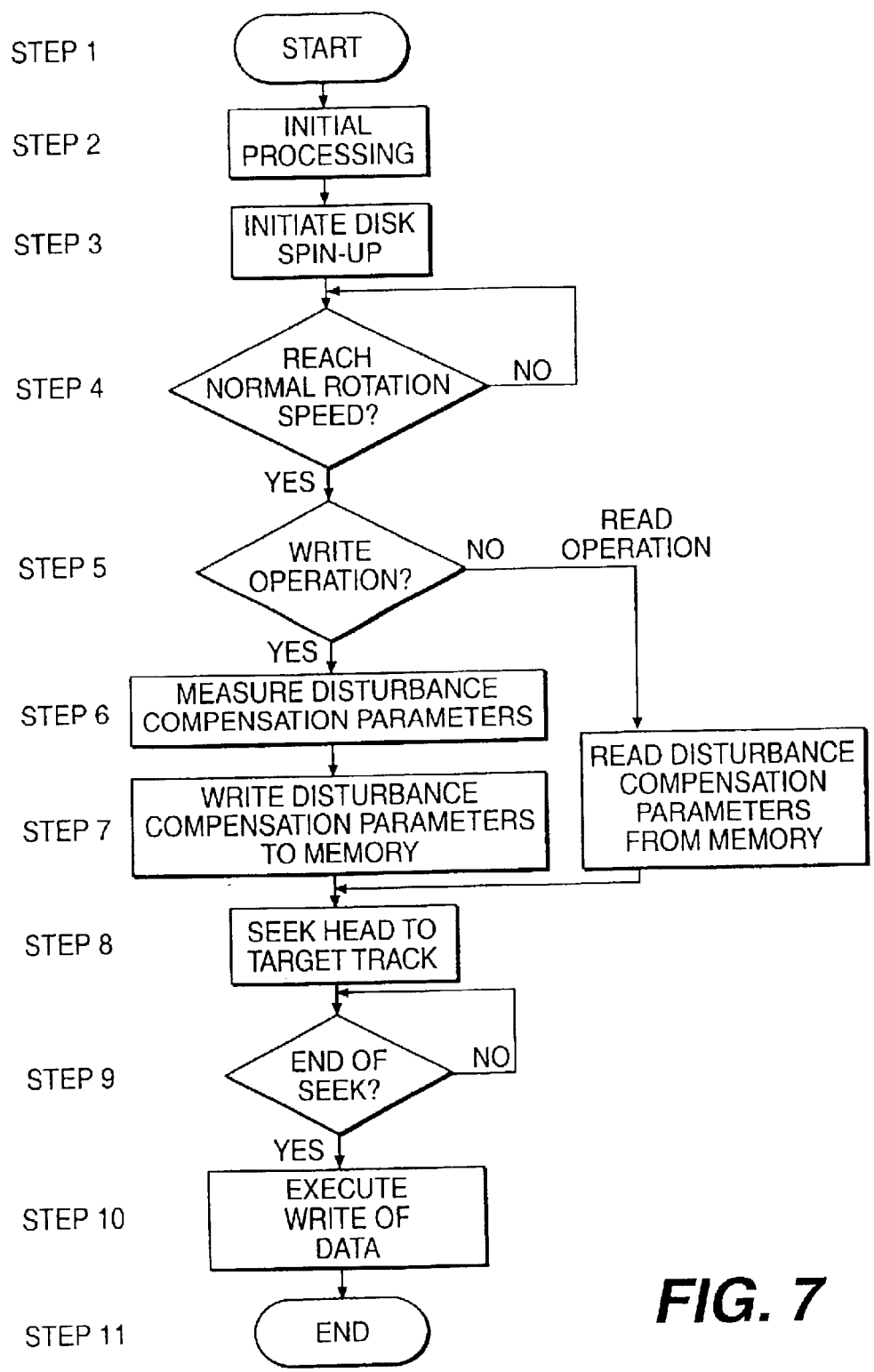
FIG. 7 shows a flow chart describing a record write command and a read command process according to the first embodiment of the magnetic disk drive of the present invention.

FIG. 6 describes the operation of the disk drive following receipt of a read or a write command to an end of the read or write operation starting from a stand-by status according to an example of the present invention. In FIG. 6, prior to a time 0, a disk is halted because a magnetic disk drive is in the stand-by status and the speed of rotation at this status is 0 RPM. FIG. 7 shows a flow chart indicating each step in the flow of write and read operations for each process executed by a microprocessor.

When a write command 71 is issued at a time 0, a disk spin-up sequence 73 is performed after a short period of initial processing 72 (step 2 in FIG. 7). The disk spin-up sequence 73 exists between the start of disk spin-up 88 (step 3 in FIG. 7) and an end of disk spin-up 89 that occurs when a decision is reached (step 4 in FIG. 7) that the speed of disk rotation had reached a normal rotation speed (4200 RPM). Disk spin-up sequence 73 in a magnetic disk drive used as a prototype takes approximately 1500 ms. Thereafter, a dummy seek is repeated in a disturbance measurement step 74 (step 6 in FIG. 7) for improving the seek accuracy of the head. For the disturbance measurement, approximately 500 ms is required in one example. A seek operation 75 (step 8 in FIG. 7) is performed and a write processing 76 (step 10 in FIG. 7) is performed after confirming an end of the head seek at the target data track (step 9 in FIG. 7). A time between the issuance of the write command 71 and the end of execution of the write command 77 is approximately 2.1 seconds.

Also, FIG. 6 shows a description of executing a read command 81. The initial processing 82 and spin-up sequence 83 to the end of disk spin-up 89 are the same as that for the issuance of the write command 71. The time relating to the disturbance measurement is reduced as compared with the time required for the disturbance measurement for the issuance of write command 71. Different from the issuance of write command 71, is the reading from a memory (step 7 in FIG. 7) an initial parameter as a compensation parameter without performing the disturbance measurement and using the initial parameter. In a seek operation 85 (step 8 in FIG. 7), there is employed a method for making wider a slice to decide the end of the seek operation for a target data track as compared with a seek operation 75 in the issuance of write command 71. Accordingly, despite the use of the initial parameter for the disturbance compensation parameter, the time for the seek operation 85 is kept equal to a time for the seek operation 75. The time required for the read process 86 (step 10 in FIG. 7) is the same as the time required for the write processing 76. The time from the issuance of the read command 81 to the end of execution of the read command 87 is approximately 1.6 seconds which is shorter than the 2.1 seconds for the write command 71.

Based upon the present invention, the access performance executed at the time of employing an automatic power down sequence is better for the read command than the write command and a magnetic disk drive for achieving both a lower power consumption and an improved access performance can be realized according to this embodiment.

<Embodiment 2>

Figure 8:
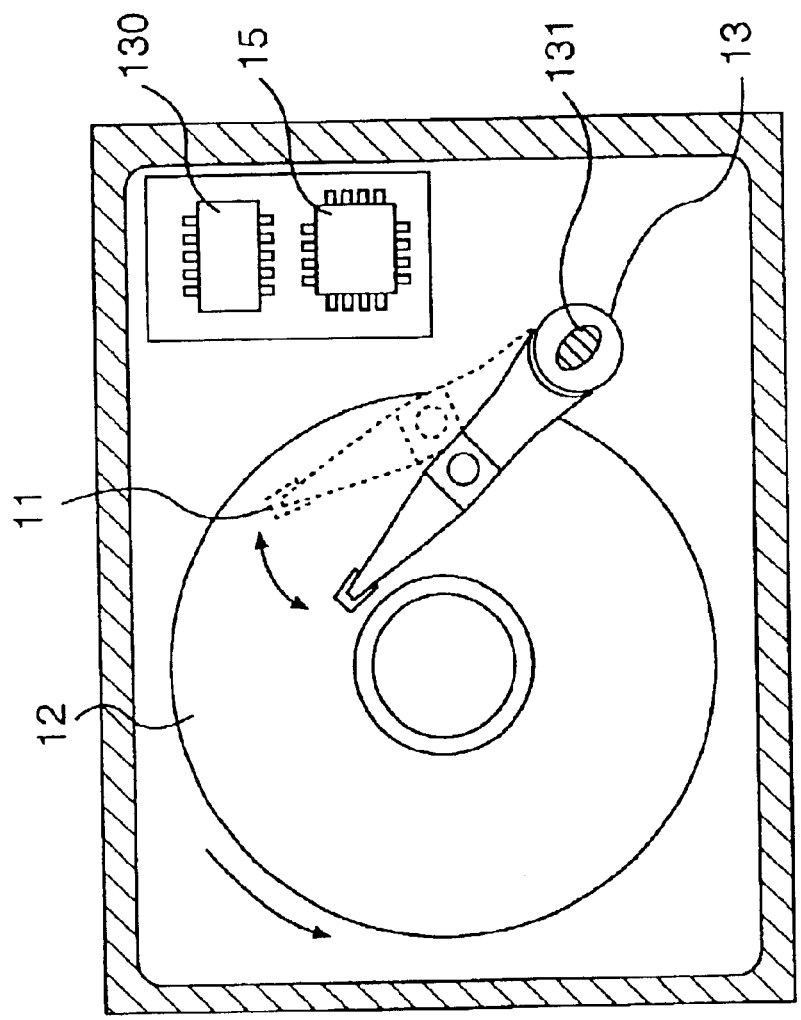
FIG. 8 shows a plan view indicating an example of a second embodiment of a magnetic disk drive based on the pre sent invention.

In a second embodiment of the magnetic disk drive of the present invention, the basic configuration is the same as shown in FIG. 8 and described in the aforementioned conventional art except for a non-volatile RAM 130 positioned adjacent to a head preamplifier 15 and a thermometer device 131 mounted in the rotational center of rotary actuator 13 Although the non-volatile RM 130 can be mounted on the package board as shown, the main function performed by it is to store different disturbance compensation parameters for each magnetic disk drive. Therefore, in considering a control process on the factory production line, when the non-volatile RAM 130 is placed in an enclosure, a disturbance compensation parameter can be measured and written into the non-volatile RAM 130 in a process performed before it is combined with the package board and the productivity is increased thereby. Also, the thermometer device 131 can be mounted on the package board, since a main object of this device is to compute the disturbance compensation parameter in association with measured temperatures However, it is effective to measure the temperature around the rotary actuator 13 which influences the disturbance compensation parameter the most. Accordingly, it is preferred to place the thermometer device 131 at center of rotation of the rotary actuator so as not to affect the rotational moment of the actuator.

Figure 9:
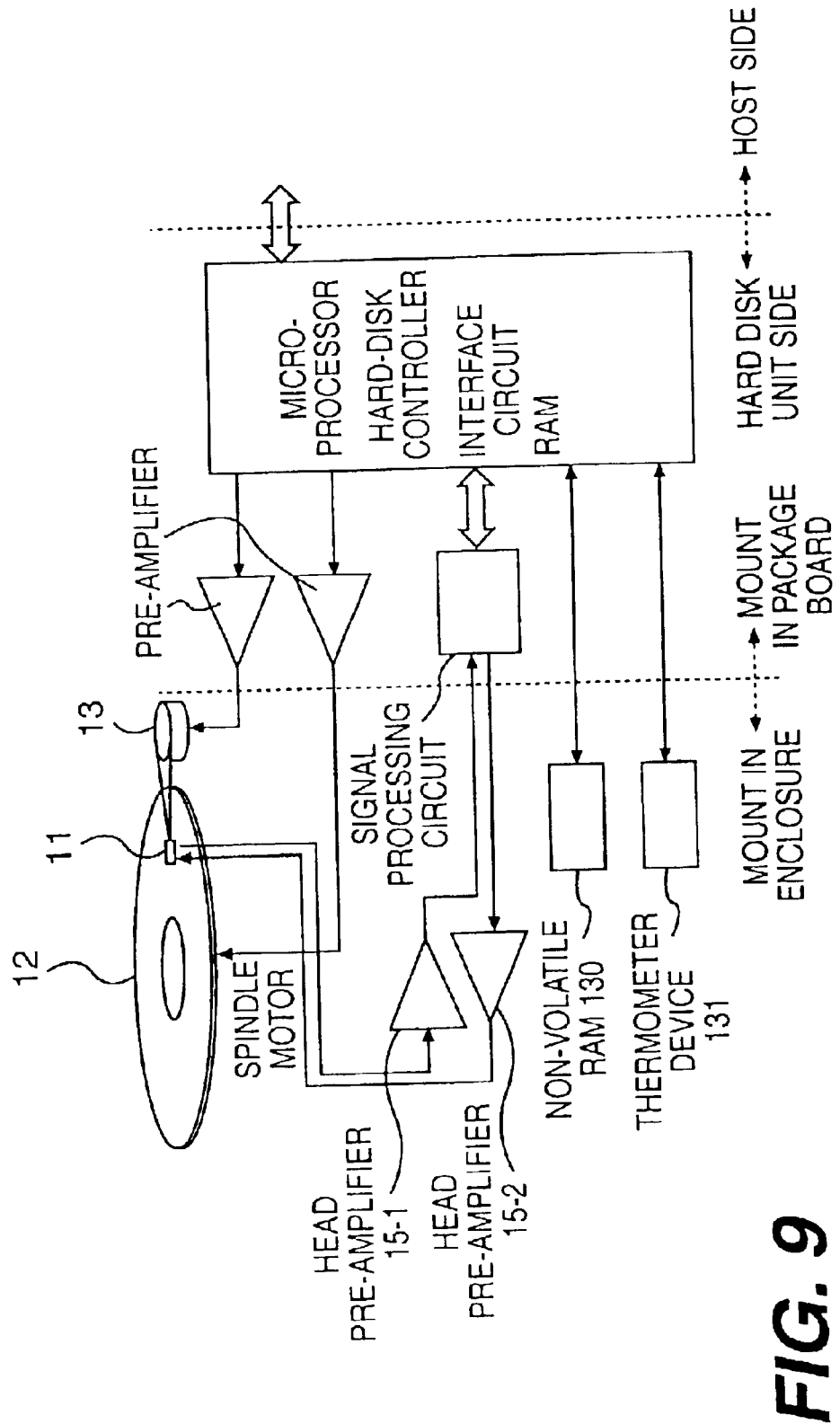
FIG. 9 shows a block diagram indicating an example of the second embodiment of the magnetic disk drive based on the present invention.
Figure 12A:
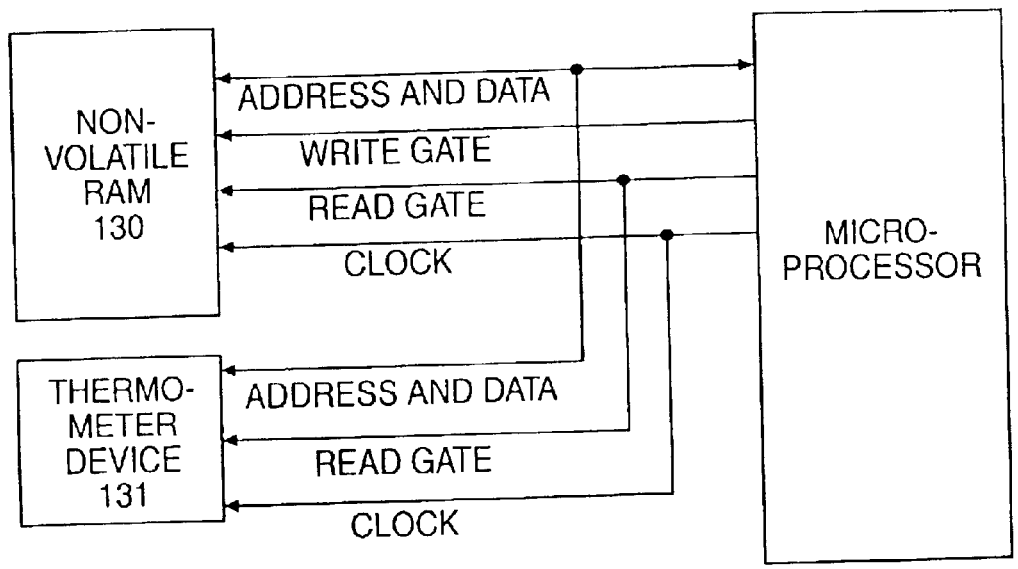
FIG. 12A is a block diagram showing data communication between a non-volatile RAM memory or a thermometer device and a microprocessor in a serial interface protocol for the second embodiment of the magnetic disk drive of the present invention.
Figure 12B:
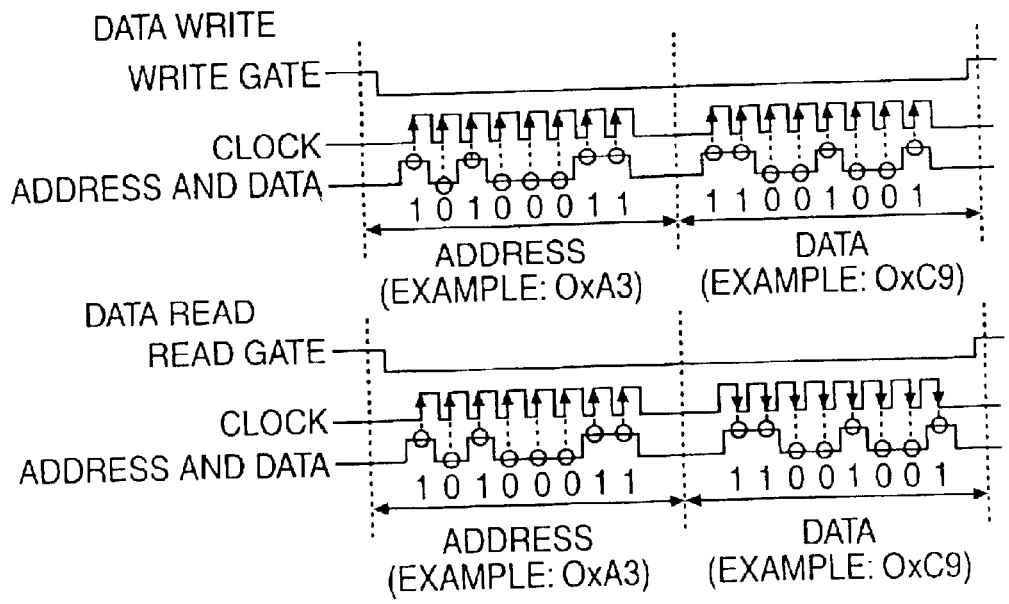
FIG. 12B shows a time chart indicating an example of an address and data for performing a data write and a data read in the serial interface protocol for the second embodiment of the magnetic disk drive of the present invention.

Whereas the non-volatile RAM 130 and the thermometer device 131 are mounted in the enclosure as shown, a microproceseor mounted on the package board controls directly the non-volatile RAM 130 and/or the thermometer device 131 as shown in a block diagram of FIG. 9. This control is different from the control of the spindle motor and voice coil motor 14 attached to the rotary actuator 13 via preamplifiers and is different from the control of the head preamplifiers 15-1 and 15-2 via a signal processing circuit and a hard disk controller. This is because a digital signal transfer is available for data communication between the non-volatile RAM 130 or the thermometer device 131 and the microprocessor, and a digital signal transfer method is employed in the present invention for reducing an influence of an outside noise. Further, as shown in FIG. 12A, a serial interface protocol of the digital data is performed between non-volatile RAM 130 or thermometer device 131 and the microprocessor is used for reducing the number of control lines Data write from the microprocessor to the non-volatile RAM 130 is performed by transferring an 8 bit address (e.g., 'A3' in FIG. 12B) and consecutively 8 bit data (e.g., 'C9' in FIG. 12B) in synchronism with a low-to-high transition of a clock started after enabling a write gate signal. Data read from the nonvolatile RAM 130 or the thermometer device 131 to the microprocessor is performed by transferring an 8 bit address (e.g., 'A3' in FIG. 12B) from the microprocessor in synchronism with a low-to-high transition of the clock after enabling a read gate signal and by receiving the 8 bit data (e.g., 'C9' in FIG. 12B) in synchronism with a high-to-low transition of the clock.

Moreover, although a parallel transfer method is available as well, even if there is a space required for a connector wiring between the microprocessor on the package board and the non-volatile RAM 130 or the thermometer device 131 in the enclosure, there is an increase in cost due to the problem caused by the increase in size of the connector.

Figure 10:
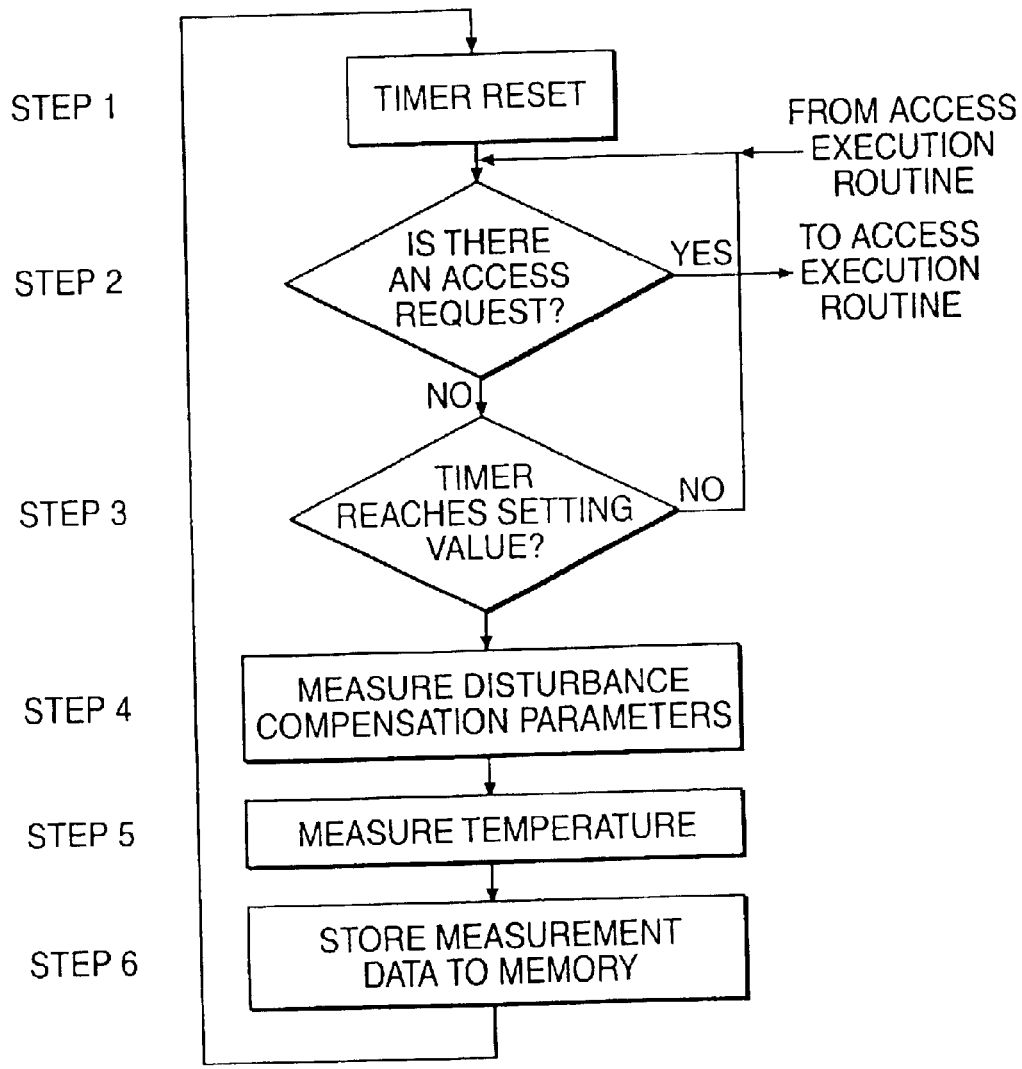
FIG. 10 shows a flow chart describing a process for writing a disturbance compensation parameter into a nonvolatile RAM in the second embodiment of the magnetic disk drive of the present invention.

In a magnetic disk drive of the present invention, a disturbance compensation parameter is measured and recorded in advance in a non-volatile RAM 130 at the factory. Because a read process has a wide allowable range for a seek operation as compared to a write process, the access performance can be improved by reading a pre-measured value from the non-volatile RAM 130 without measuring the disturbance compensation parameter and using the parameter. Although it is preferred to measure the initial parameter for several different temperatures because the disturbance compensation parameter is mostly influenced by the temperature, it is not realistic to measure the disturbance compensation parameter for a wide range of temperatures in the factory. Accordingly, a magnetic disk drive of the present invention has a function of automatically measuring a disturbance compensation parameter altered by several thermal conditions through a process shown in the flow chart of FIG. 10. For instance, a timer of a microprocessor is reset in step 1 and a check of an access request from a host machine is performed in step 2. If a value of the timer reaches a preset value in step 3, a disturbance compensation parameter is measured by a dummy seek operation in step 4 and simultaneously, thermal data is read from thermometer device 131 in step 5. Thereafter, a disturbance compensation parameter table for the non-volatile RAM 130 is updated in step 6. Since the preset value of the timer in step 3 is set for approximately 1 minute, for example, the disturbance and temperature are measured at approximately 1 minute intervals.

FIG. 11 shows an example of a disturbance compensation parameter table for a non-volatile RAM 130. A temperature range from a temperature 0° C. to 70° C. is classified into seven groups at 10° C. increments. The disturbance compensation parameter data corresponding to 17 different radial positions of the disk can be recorded by a cylinder number for each temperature group. The disturbance compensation parameter measured in FIG. 10 updates the thermal data and the measured item in the table corresponding to the cylinder number.

FIG. 11 shows a method for computing the disturbance compensation parameters from the table as well using interpolation. For instance, consider the following parameters: measured thermal data (18° C.) and cylinder number for a seek operation (2600). A group of a thermal range 10 to 20° C. is referred to the disturbance compensation parameter table and the data (+19 and +13) corresponding to cylinders 2000 and 3000 is read from this table. Since a target cylinder number is 2600, a data +15 is computed and used as a seek parameter by interpolation using these two data (+19 and +13). In a magnetic disk drive of the present invention, a seek operation can be performed that is minimally influenced by the variations in temperature by computing a disturbance compensation parameter based on the cylinder number and the measured temperature.

<Embodiment 3>

Figure 13:
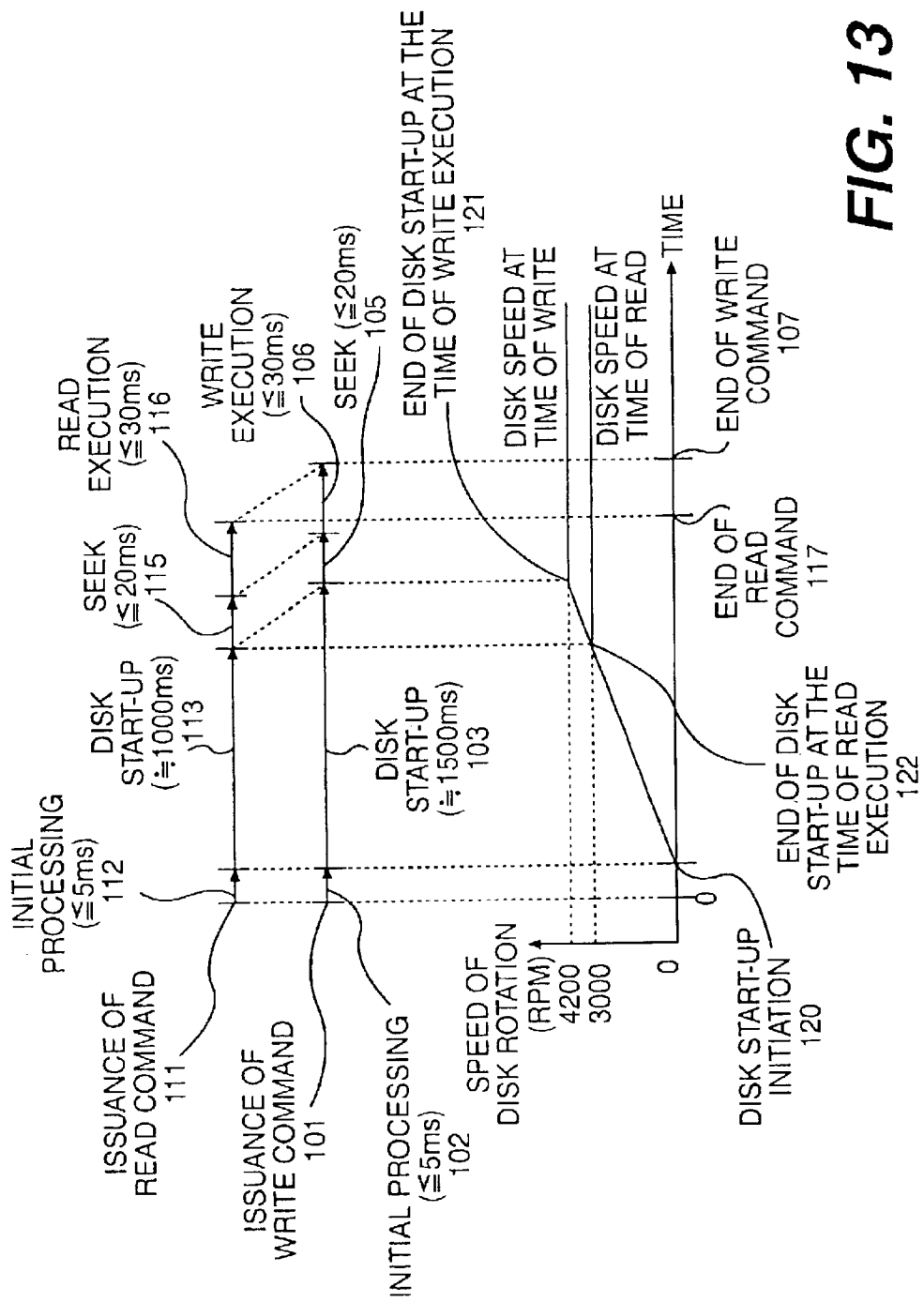
FIG. 13 shows a time chart describing a time from the receipt of a write command and a read command to an end of command execution in a third embodiment of a magnetic disk drive of the present invention.
Figure 14:
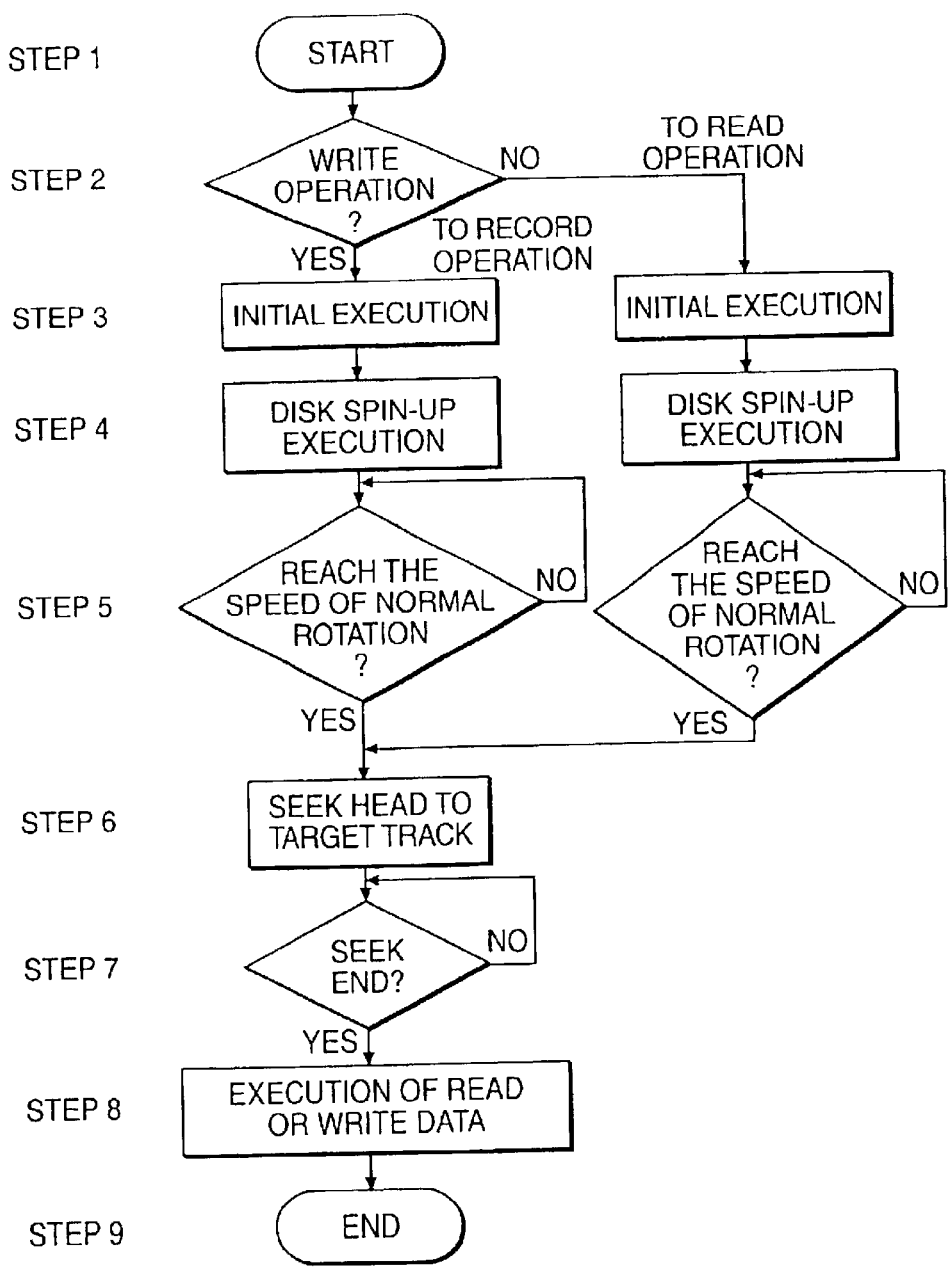
FIG. 14 shows a flow chart describing a write command and a read command process in the third embodiment of the magnetic disk drive of the present invention.

In the third embodiment of a magnetic disk drive of the present invention, the basic configuration is the same as in the aforementioned conventional art, however the magnetic disk drive of the third embodiment selects two rotational speeds as normal operation speeds. In FIG. 13, prior to a time 0, a disk is halted because a magnetic disk drive is in a stand-by status and the speed of disk rotation at this status is 0 RPM. FIG. 14 shows a flow chart detailing the write and read operations executed by a microprocessor.

When a write command 101 is issued at time t=0 for a magnetic disk drive under a stand-by status, the disk spin-up sequence 103 is performed (step 4 in FIG. 14) after a short initial processing time 102 (step 3 in FIG. 14) and beginning at the start of disk spin-up 120. A seek operation 105 is performed (step 6 in FIG. 14) after the disk rotation speed reaches 4200 RPM (step 5 in FIG. 14) and an end of the disk spin-up at the time of write execution 121 is completed. Execution of the data write 106 is performed (step 8 in FIG. 14) after confirming an end of the settling of the seek operation on a target track (step 7 in FIG. 14). In an exemplary magnetic disk, a time between the issuance of a write command 101 and an end of the write command 107 is approximately 1.6 seconds.

When a read command 111 is issued for a magnetic disk drive under a stand-by status, the spin-up sequence 113 is almost the same for the write command 101. An end of the disk spin-up sequence at the time of the read execution process 122, the disk rotation speed has reached 3000 RPM (step 5 in FIG. 14). Therefore, the time required for the disk spin-up sequence 113 is set to approximately 1000 ms which is less than that of the approximately 1500 ms required for the disk spin-up sequence 103 for the issuance of the write command 101. Thereafter, a seek operation 115 and a read process 116 are consecutively performed. The time for the issuance of the read command 111 to an end of the execution of the read command 117 is approximately 1.1 seconds which is less than the approximately 1.6 seconds required for the write command 107.

Figure 15:
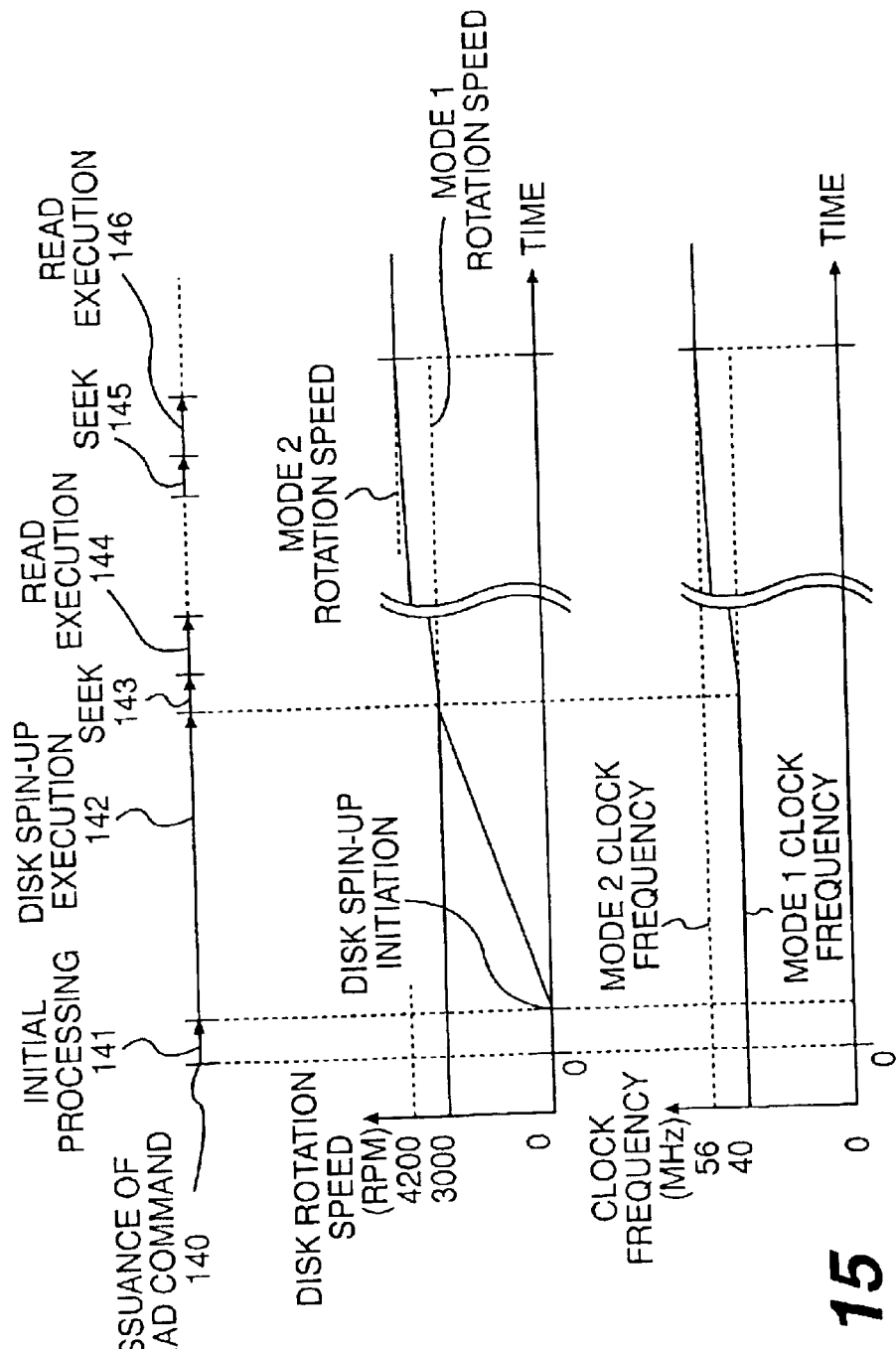
FIG. 15 shows a time chart describing the transition between different modes of disk rotation speed and a variation of a clock frequency of a microprocessor in the third embodiment of the magnetic disk drive of the present invention.

The magnetic disk drive based on the third embodiment of the invention, therefore, has two modes of normal operation rotation speed which are 4200 RPM and 3000 RPM, respectively. Whereas the time required for the disk spin-up sequence can be shortened in a first mode at 3000 RPM, the data transfer speed is reduced to 70%. To solve this problem, the magnetic disk drive of the third embodiment has a function that gradually increases the disk rotation number to a second operation (mode 2) at 4200 RPM after the disk spin-up execution 142 in mode 1 of 3000 RPM is executed by receiving an issuance of read command 140 as shown in FIG. 15. Since an acceleration of a disk rotation speed from the mode 1 to the mode 2 operation is performed more slowly than that of the rotatory acceleration of the disk spin-up execution 142, even during this acceleration period, seeks operations 143, 145 and read processes 144 and 146 can be performed. Therefore, the disk rotation speed can reach the mode 2 operation at 4200 RPM without deteriorating the access performance as to the read process. Further, a clock frequency of a microprocessor is set to 40 MHz in the mode 1 operation at 3000 RPM, and is set to 56 MHz in the mode 2 operation at 4200 RPM and is thereby increased in response to the disk rotation speed at the time of acceleration from the mode 1 to the mode 2 operation. Accordingly, an otherwise complicated timing regulation resulting from the variation of the transfer speed can be simplified.

When an automatic power down sequence is employed, a magnetic disk drive of the present invention can provide data access at the time of the issuance of a read command more quickly than at the time of issuance of the write command and a magnetic disk drive accomplishing this function while providing low power consumption can be realized by the invention.

A magnetic disk drive of the present invention, having a function for halting a spindle motor to achieve a lower power consumption, can maintain data access performance at the time of the read command and a lower power consumption disk drive can be designed by regulating the time to become faster in a read command process than in a write command process from the condition wherein the spindle motor in halted to an end of the data transfer.

While a preferred embodiment of the present invention has been described in detail, with variations and modifications, further embodiments, variations and modifications are contemplated within the broader aspects of the present invention, in addition to the advantageous details, in accordance with the spirit and scope of the following claims.

What is claimed is:

1. A magnetic disk drive, comprising:

at least one magnetic disk;

a spindle motor;

at least one magnetic head and actuator;

means for controlling power supplied to said spindle;

a processor for controlling a head seek operation of said actuator; and a table specifying a disturbance compensation parameter, wherein said processor compensates a disturbance applied to the actuator during the head seek operation based on said table, wherein the compensation based on the table by the processor is carried out only in responding to a read command.

2. A magnetic disk drive according to claim 1, wherein a seek operation for a write command is carried out using disturbance compensation parameters determined by said processor with a dummy seek operation at a time of receiving said write command.

3. A magnetic disk drive, comprising:

at least one magnetic disk;

a spindle motor;

at least one magnetic head and actuator;

means for controlling power supplied to said spindle;

a processor for controlling a head seek operation of said actuator; and a table specifying a disturbance compensation parameter, wherein said processor compensates a disturbance applied to the actuator during the head seek operation based on said table, wherein said processor updates the table with a value measured by the dummy seek operation.

* * * * *